Patented May 22, 1934

1,960,197

UNITED STATES PATENT OFFICE 1,960,197

ACCELERATOR FOR VULCANIZATION OF RUBBER

Max H. Zimmermann, Rye, N. H., assignor to The Firestone Tire & Rubber Company, Akron, Ohio, a corporation of Ohio No Drawing. Continuation of application Serial No. 424,446, January 29, 1930. This application May 16, 1931, Serial No. 537,991. In Canada June 30, 1930

18 Claims. (Cl. 18—53)

This invention relates to accelerators for the vulcanization or curing of rubber compounds.

There have heretofore been known a large number of nitrogen and nitrogen sulfur-containing compounds for accelerating vulcanization of rubber of which diphenyl-guanidine disclosed in Weiss Patent No. 1,411,231, and mercapto-benzo-thiazole described by Jacobson and Frankenbaker, Ber. 24, 1400 (1891), respectively may be cited as examples. These compounds when added to the rubber mix before vulcanization improve the properties of the product and shorten the time of cure.

In the utilization of a number of the above-mentioned compounds there has been a distinct disadvantage in that the accelerating power of the nitrogen or nitrogen sulfur compound becomes effective during the compounding or processing of the raw rubber so that the latter is "set up" or partially vulcanized in the mill, calender or tubing machine, or other apparatus in which the compounds are handled.

Accordingly in the present invention this disadvantage is avoided since the accelerator herein described does not begin to act to any appreciable extent to bring about the vulcanization of the rubber until the latter has been heated to approximately the vulcanizing temperature, the temperature of rubber during the processing or compounding being at a considerably lower temperature than that used during vulcanization.

This application is a continuation of my copending application Serial No. 424,446 filed January 29, 1930.

The accelerator devised and employed in accordance with the present invention is specifically the reaction product of a mercapto-aryl-thiazole and formaldehyde.

A method of producing this accelerator is by boiling together a mercapto-aryl-thiazole, for example mercapto-benzo-thiazole with a formaldehyde solution, as for example commercial 40% formaldehyde. The molecular proportion of formaldehyde being in excess of the molecular equivalent of the mercapto-benzo-thiazole. Upon prolonged heating the mercapto-benzo-thiazole is converted into an oily product which upon cooling solidifies into a crystalline mass, which is a mixture of mercapto-benzo-thiazole and the reaction product thereof with formaldehyde. The formaldehyde water solution of the reaction product, however, upon cooling yields a pure crystalline reaction product of mercapto-benzo-thiazole and formaldehyde.

A modified method is to dissolve the mercapto-benzo-thiazole in a mixture of alcohol and 40% solution of formaldehyde by applying heat, the proportions used being as follows: 17 parts of mercaptobenzo-thiazole; 17 parts of alcohol and 10 parts of 40% formaldehyde solution. The mixture is brought to boiling point in a closed vessel provided with a reflux condenser. After the mixture has boiled for a sufficient period to completely dissolve the mercapto-benzo-thiazole the mixture is allowed to cool, whereupon a substantially pure crystalline reaction product will crystallize out and which may be filtered from the mother liquor. The latter may then be used for a succeeding batch or may be distilled to recover the alcohol and to crystallize out a further quantity of the reaction product.

This new product is in the form of white crystals having a melting point of 130° C. uncorrected. The product may be recrystallized from benzene or toluene.

A typical example of the use of the above reaction product as an accelerator in the manufacture of a vulcanized rubber product is the following composition:

| Ingredients | Parts |
|---|---|
| Smoked sheets | 91.87 |
| Sulfur | 2.75 |
| Zinc oxide | 3 |
| Stearic acid | 1.5 |
| Reaction product | .88 |

This stock, vulcanized by heating samples thereof at varying times in a press under temperatures of 235° F. and 280° F., and tested, resulted in the following data:

| Time of cure at 235° F. | Modulus at 600% elongation | Tensile at break in lbs./in.$^2$ | Elongation at break |
|---|---|---|---|
| 30 min | 110 | 745 | 840 |
| 60 min | 740 | 2320 | 770 |
| 90 min | 1050 | 2700 | 745 |
| 120 min | 1205 | 2860 | 725 |
| At 280° F. | | | |
| 15 min | 1040 | 2335 | 720 |
| 30 min | 1070 | 2480 | 720 |
| 45 min | 1095 | 2640 | 735 |
| 60 min | 1030 | 2670 | 740 |

The above results show the desirable accelerating properties of the new reaction product and further show that a retarding of the acceleration is accomplished. Acceleration of the vulcanization process is substantially delayed in curing rubber compounds using the new reaction product as compared with the action of previously known types of accelerators, this fact being indicated by the low state of cure which resulted after vulcanizing for thirty minutes at the low temperature 235° F.

The example above given is to be understood as merely illustrative of one rubber compound which may be formed with the new accelerator and is not to be considered limitative of the scope of the invention. Equivalent methods of manufacturing the new accelerator and of compounding the accelerator to produce a new vulcanized rubber compound will be apparent to those skilled in the art to which this invention pertains.

It will further be understood that other mercapto-aryl-thiazoles than mercapto-benzo-thiazole may be used in the reaction with formaldehyde to obtain products in accordance with the present invention. Thus, for example mercapto-tolyl-thiazoles, mercapto-xylyl-thiazoles, mercapto-naphthyl-thiazoles and homologs thereof when reacted upon by formaldehyde will produce equally effective accelerators.

Various other modifications may be resorted to without departing from the spirit of the invention or the scope of the appended claims.

What is claimed is:

1. The reaction product of a mercapto-aryl-thiazole and formaldehyde, the aryl radical being a member of the benzene series.

2. The reaction product of mercapto-benzo-thiazole and formaldehyde.

3. The process of producing a rubber vulcanization accelerator which comprises treating a mercapto-aryl-thiazole with formaldehyde under reacting conditions, the aryl radical being a member of the benzene series.

4. The process of producing a rubber vulcanization accelerator which comprises treating a mercapto-aryl-thiazole with an aqueous solution of formaldehyde, the aryl radical being a member of the benzene series.

5. The process of producing a rubber vulcanization accelerator which comprises heating a mixture of a mercapto-aryl-thiazole and an aqueous solution of formaldehyde, the aryl radical being a member of the benzene series.

6. The process of producing a rubber vulcanization accelerator which comprises heating a mixture of a mercapto-aryl-thiazole and an aqueous solution of formaldehyde, and cooling to crystallize out the reaction product, the aryl radical being a member of the benzene series.

7. The process of producing a rubber vulcanization accelerator which comprises heating a mercapto-aryl-thiazole with alcohol and an aqueous solution of formaldehyde, the aryl radical being a member of the benzene series.

8. The process of producing a rubber vulcanization accelerator which comprises treating mercapto-benzo-thiazole with formaldehyde under reacting conditions.

9. The process of producing a rubber vulcanization accelerator which comprises treating mercapto-benzo-thiazole with an aqueous solution of formaldehyde.

10. The process of producing a rubber vulcanization accelerator which comprises heating a mixture of mercapto-benzo-thiazole and an aqueous solution of formaldehyde.

11. The process of producing a rubber vulcanization accelerator which comprises heating a mixture of mercapto-benzo-thiazole and an aqueous solution of formaldehyde, and cooling to crystallize out the reaction product.

12. The process of producing a rubber vulcanization accelerator which comprises heating mercapto-benzo-thiazole with alcohol and an aqueous solution of formaldehyde.

13. A process of manufacturing vulcanized rubber which comprises heating rubber and a vulcanization agent in the presence of an accelerator comprising the reaction product of a mercapto-aryl-thiazole and formaldehyde, the aryl radical being a member of the benzene series.

14. A process of manufacturing vulcanized rubber which comprises heating rubber and a vulcanization agent in the presence of an accelerator comprising the reaction product of mercapto-benzo-thiazole and formaldehyde.

15. A vulcanized rubber product prepared by heating a mixture of rubber and sulfur in the presence of a vulcanization accelerating composition comprising a reaction product of a mercapto-aryl-thiazole and formaldehyde, the aryl radical being a member of the benzene series.

16. A vulcanized rubber product prepared by heating a mixture of rubber and sulfur in the presence of a vulcanization accelerating composition comprising a reaction product of mercapto-benzo-thiazole and formaldehyde.

17. The process of effecting the curing of rubber which consists in bringing together under reacting conditions formaldehyde and a mercapto-aryl-thiazole to form a vulcanization accelerator, incorporating the accelerator in a rubber mix and vulcanizing the same, the aryl radical being a member of the benzene series.

18. The process of effecting the curing of rubber which consists in bringing together under reacting conditions formaldehyde and mercapto-benzo-thiazole to form a vulcanization accelerator, incorporating the accelerator in a rubber mix and vulcanizing the same.

MAX H. ZIMMERMANN.